United States Patent [19]

Wu

[11] Patent Number: 5,474,402
[45] Date of Patent: Dec. 12, 1995

[54] PLASATIC SCREEN PANEL CONNECTING DEVICE

[76] Inventor: Ming-Hsin Wu, 20, Lane 92, Shing Ell Street, Tao Yuan City, Tao Yuan County, Taiwan

[21] Appl. No.: 240,615

[22] Filed: May 11, 1994

[51] Int. Cl.⁶ ............................... F16B 9/00; E04B 2/74; E04C 2/38
[52] U.S. Cl. ...................... 403/405.1; 52/239; 52/238.1; 256/25
[58] Field of Search .................................... 52/238.1, 239; 160/135; 256/27, 25; 403/405.1

[56] References Cited

U.S. PATENT DOCUMENTS

| | | | |
|---|---|---|---|
| 1,611,096 | 12/1926 | Alexander | 52/239 X |
| 1,635,573 | 7/1927 | Bertram | 160/135 X |
| 1,661,003 | 2/1928 | Miller | 160/135 X |
| 4,860,812 | 8/1989 | DePietro et al. | 52/239 X |
| 5,060,631 | 10/1991 | Lin | 160/135 X |

*Primary Examiner*—Anthony Knight
*Attorney, Agent, or Firm*—Bacon & Thomas

[57] ABSTRACT

A connecting device includes a trim body which can be readily attached to the hollow portion of the edge of the screen panel. A connecting block is attached to the end portion of the screen panel. A connecting bracket is attached to two adjacent connecting blocks. A plurality of screws can be applied to fasten the connecting bracket and the connecting block. A band cover is attached to the top of the trim body and the connecting bracket.

3 Claims, 4 Drawing Sheets

PLASATIC SCREEN PANEL CONNECTING DEVICE

BACKGROUND OF THE INVENTION (a) Field of the Invention

This invention relates to a connecting device, more particularly, to a plastic screen panel connecting device which facilitates an easy and secure connection between two adjacent screen panels.

(b) Description of the Prior Art

The plastic screen panel has been widely used in partitioning offices. This kind of screen panel can be assembled on site to form an individual space for staff. This screen panel really provides convenience in our modem office. On the other hand, there are many designs in the configuration of the screen panel and each of them has their own characteristic. But no matter which configuration the screen panel inherits, the connecting device between two adjacent screen panels is a T or L shape metal bracket. This metal bracket has a plurality of holes where the screws can pass through to fix the metal bracket to two adjacent screen panels, accordingly, so those two adjacent screen panels can be fastened together.

Normally, the metal plate is attached to the upper part or the lower part of the screen panel. But the connection provided by the metal bracket between two adjacent screen panels is poor. On the other hand, the metal bracket is naked without any cover, accordingly, the metal bracket becomes a potentially dangerous part in the office. If our skin contacts with the metal bracket accidentally, our skin will be injured. If our clothing contacts it, the clothing will be damaged. Furthermore, at the present stage, no cover is provided for the metal bracket. As a result, the integrity and the appearance of the screen panel is lost.

As described above, the connection between two adjacent screen panels is too weak to sustain an impact. Once the screen panel is hit, the screen panel is easily inclined. From the above description, even if the conventional connecting device can reach a certain effect, it cannot last for a long time.

SUMMARY OF THE INVENTION

It is the object of this invention to provide a connecting device for plastic screen panels which provides a secure connection between two adjacent screen panels.

It is another object of this invention to provide a connecting device wherein the connecting device is perfectly covered, and the integrity and excellent appearance of the screen panel are ensured.

In order to achieve the objects set forth, the connecting device includes a trim body which can be readily attached to the hollow portion of the edge of the screen panel. A connecting block is attached to the end portion of the screen panel. A connecting bracket is attached to two adjacent connecting blocks. A plurality of screws can be applied to fasten the connecting bracket and the connecting block. A band cover is attached to the top of the trim body and the connecting bracket.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a plastic screen panel connecting device. In the drawings.

DETAILED DESCRIPTION OF THE PREFERRED EMBODIMENTS

Figure 1:
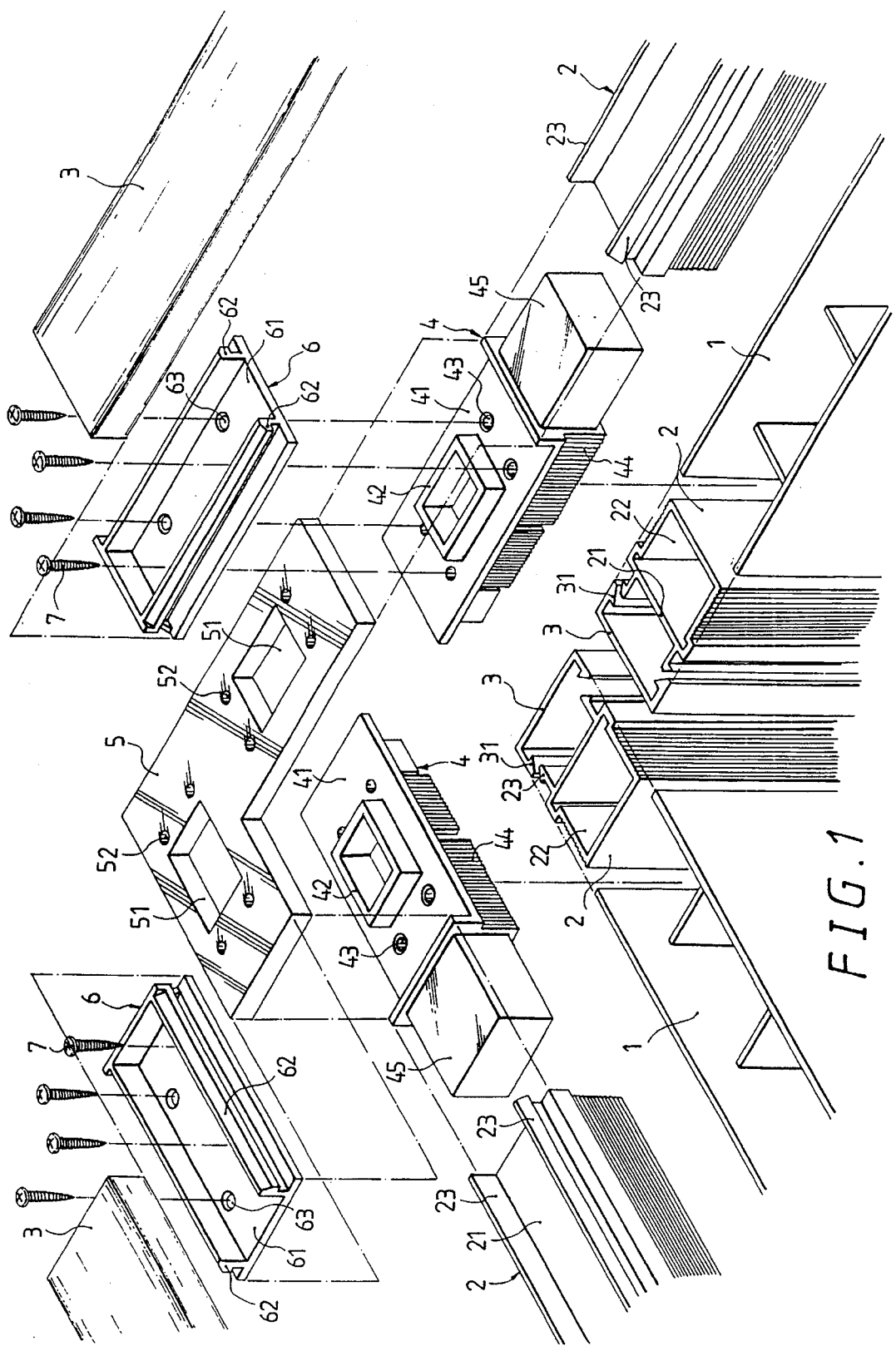
FIG. 1 is an exploded perspective view of the connecting device made according to this invention.

Referring to FIG. 1, the connecting device which can be applied to the plastic parting plate 1 made according to this invention includes a trim body 2, a band cover 3, a connecting block 4, a connecting bracket 5 and a cover socket 6. By assembling those elements, a connecting device is made.

The trim body 2 generally has a rectangular trim plate 21. A projected portion 22 is provided at the top. The projected portion 22 of the trim body 2 can be received and retained by the chamber of the plastic screen panel 1. The trim plate 21 is provided with two hooking tabs 23 extending upward. By the arrangement, the hooker 31 of the band cover 3 can be attached to the hooking tab 23 of said trim plate 21 to enclose an edge of the screen panel 1.

The connecting block 4 is formed by a metal plate 41 which has the same width as the trim plate 21 of the trim body 2. The metal plate 41 further includes a positioning block 42 at the top. The metal plate 41 is provided with a plurality of holes 43 adjacent to the positioning block 42. The connecting block 4 further includes a pair of retaining plates 44 which can be received and retained within the chamber of the plastic screen panel 1. This retaining plate 44 can also be received by the projected portion 22 of the trim body 2. A connecting bar 45 is provided at the rear end of the metal plate 41. This connecting bar 45 can be received and retained by the projected portion 22 of the trim body 2.

Figure 2B:
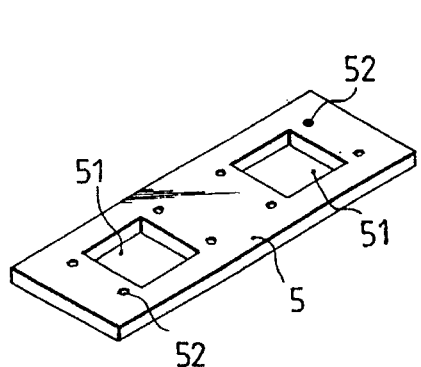
FIGS. 2A, 2B and 2C are perspective views showing a plurality of connecting brackets with different configurations.
Figure 2C:
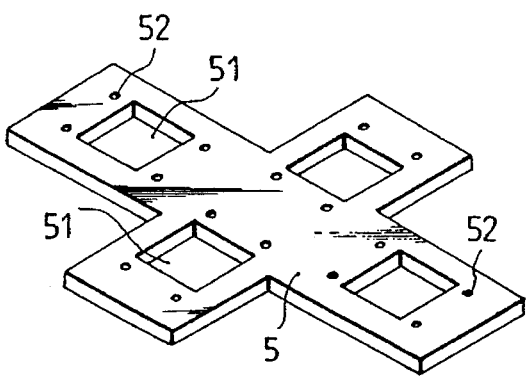
Figure 2A:
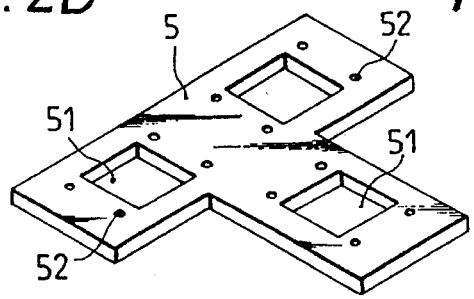
Figure 6:
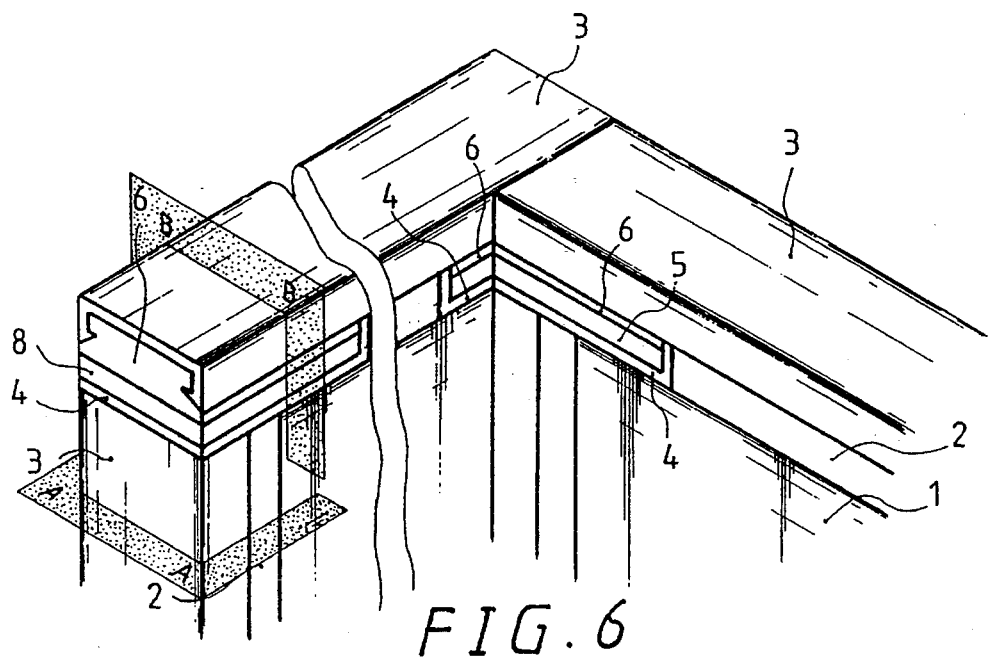
FIG. 6 is an embodiment of the connecting device made according to this invention.

A connecting bracket 5 is made from a rigid material. This connecting bracket 5 has a plurality of configurations to meet different utilizations. As shown in FIGS. 2A–2C, the connecting bracket 5 may have a linear shape, a cross shape, a L shape or a T shape. The configuration of the connecting bracket is conformed to the metal plate 41 of the connecting block 4. The connecting bracket 5 includes a rectangular opening 51 which can envelop the positioning block 42 of the connecting block 4. The connecting bracket 5 further includes a plurality of holes 52 in alignment with the holes 43 of the connecting block 4.

A cover socket 6 has the same width as the trim plate 21 of the trim body 2. The cover socket 6 includes a plate member 61 which has two clipping tabs 62. The width between the clipping tabs 62 is the same as the hooking tabs 23 of the trim body 2. When the hooking tabs 23 and the clipping tabs 62 are linked, an enclosed portion is achieved. By this arrangement, excellent integrity and appearance are achieved. The plate member 61 includes a plurality of holes 63 in alignment with the holes 43 of the connecting block 4.

Figure 3:
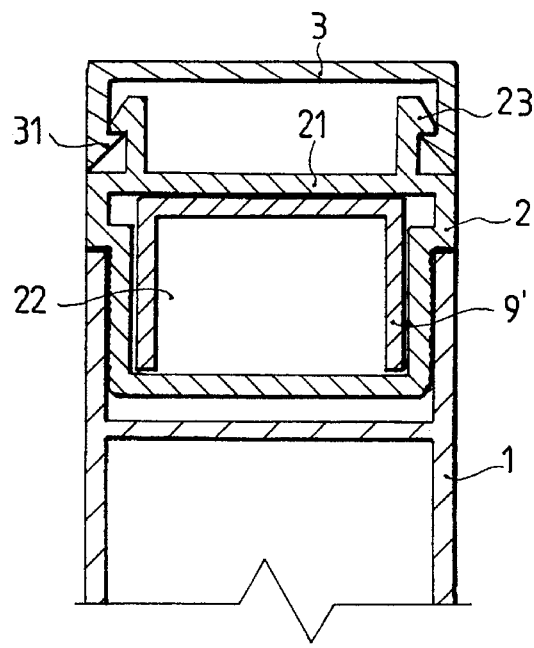
FIG. 3 is a cross-sectional view of the screen panel without installing a connecting device.

The connecting device described above can be applied to the screen panel. The plastic screen panels 1 to be connected are provided with a trim body 2 and a band cover 3. As shown in FIG. 3, the screen panel 1 is installed with a trim body 2 without the length of the metal plate 41 of the connecting block 4. The connecting bar 45 of the connecting block 4 is received by the projected portion 22 of the trim body 2. On the other hand, the retaining plate 44 is inserted in the chamber of the plastic screen panel and the projected portion 22 of the trim body 2. Then the screen panels to be connected are positioned for connection. The rectangular opening 51 of the connecting bracket 5 is enveloped over the positioning block 42 of the connecting block 4 in such a manner that the positioning block 42 of the screen panels to be connected are retained by the connecting bracket 5. After each of the connecting blocks 42 is retained in a connecting bracket 5, the cover socket 6 is applied. Then a plurality of screws 7 are applied to the holes 63 of the cover socket 6 and the holes 52 of the connecting bracket 5, and the screws 7 are locked to the holes 43 of the connecting block 4. Finally, the band cover 3 with the full length of the screen panel is attached to the trim body 2 and the cover socket 6. The hooking tab 23 of the trim body 2 and the clipping tab 62 of the cover socket 6 are engaged with the band cover 3.

Figure 4:
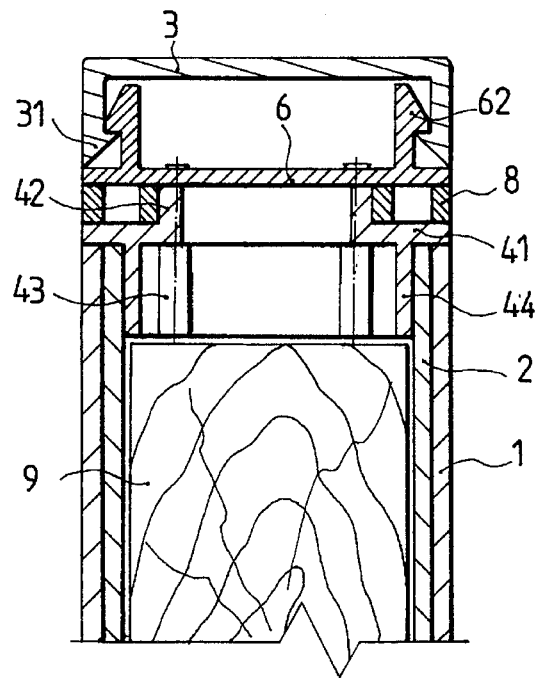
FIG. 4 is a cross-sectional view of the connecting device attached to the screen panel.
Figure 5:
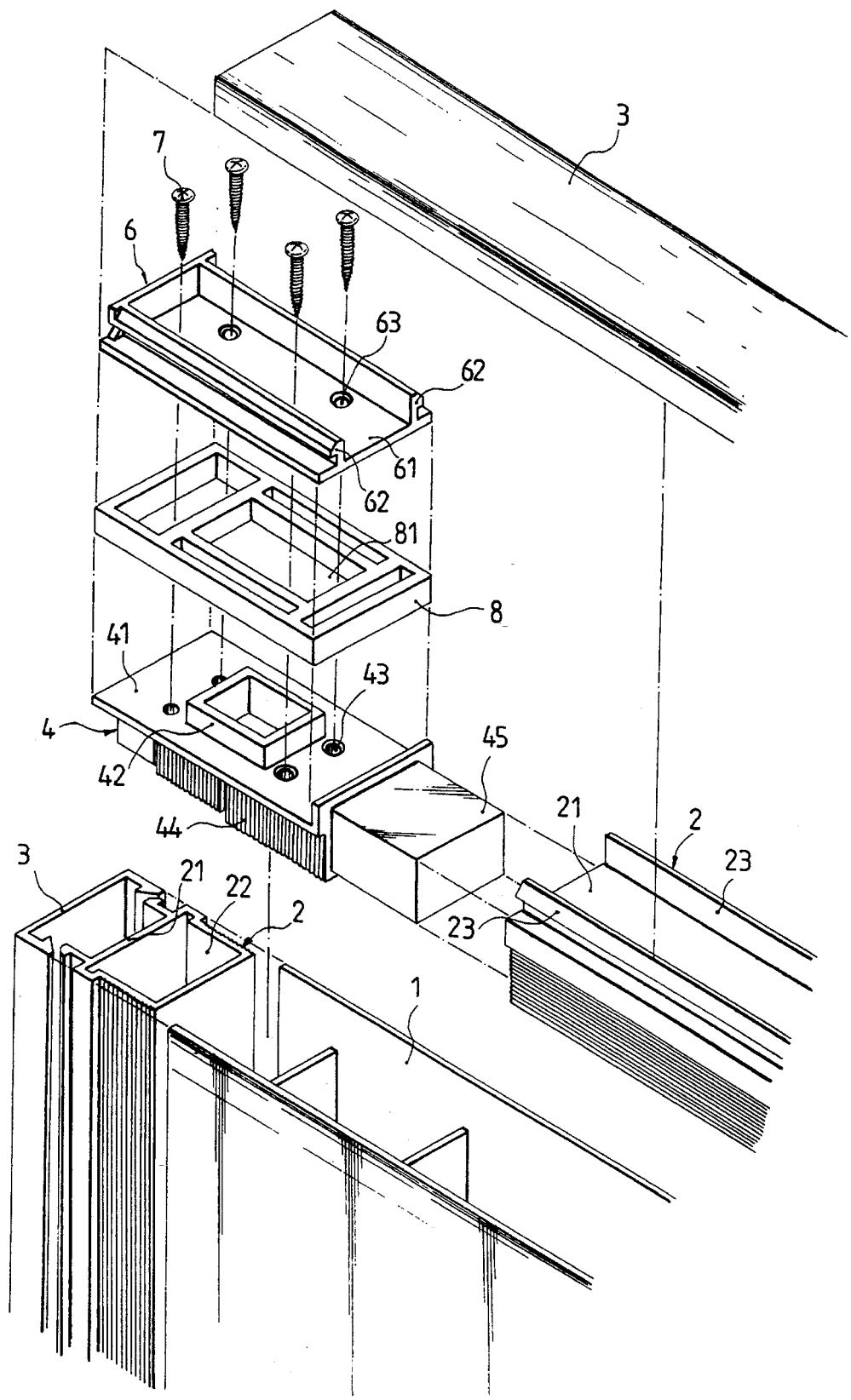
FIG. 5 is an exploded perspective view showing the end portion of the screen panel without a connecting device.

As shown in FIGS. 4 and 5, the connecting bracket 5 may be replaced by the rectangular shim 8. The size of the shim 8 is the same with metal plate 41 of the connecting block 4. This shim 8 is also provided with a rectangular opening 81 which can envelop the positioning block 42, as shown in FIG. 5. By this arrangement, the screen panel can be readily fastened and the integrity and the appearance are ensured. From the above description, the connecting device made according to this invention can really solve the problems which the existing connecting device meets.

Furthermore, a wooden block 9 or steel upright 9' can be disposed within the projected portion 22 of the trim body 2. Accordingly, the strength of the screen panel is enhanced. Besides, the retaining plate 44 located below the metal plate 41, the connecting block 4 can be divided into two parts, one is inserted into the chamber located at the top of the screen panel while the other part is received by the projected portion 22 of the trim body 2. By this arrangement, the connection between the connecting block 4 and the trim body 2 is further strengthened and ensured.

I claim:

1. A plastic screen panel connecting device, comprising:

a trim body having a portion configured to be received and retained by the plastic screen panel;

a connecting block including: a positioning block extending therefrom; a plurality of first holes adjacent to said positioning block; and a pair of retaining plates configured to be received and retained within a chamber of the plastic screen panel so as to attach the connecting block to the plastic screen panel;

a connecting bracket including a plurality of rectangular openings each receiving a positioning block of the connecting block, said connecting bracket further including a plurality of second holes in alignment with the plurality of first holes of the connecting block;

a cover socket attached to the connecting bracket including a plate member which has two clipping tabs, and a band cover attached to the cover socket and the trim body.

2. A connecting device as recited in claim 1, further comprising a connecting bar provided on the connecting block and engaged with a trim body.

3. A plastic screen panel connecting device, comprising:

a trim body having a portion configured to be received and retained by the plastic screen panel:

a connecting block including: a positioning block extending therefrom; a plurality of holes adjacent to said positioning block; and a pair of retaining plates configured to be received and retained within a chamber of the plastic screen panel so as to attach the connecting block to the plastic screen panel;

a shim provided with a rectangular opening receiving a positioning block therein;

a cover socket attached to the shim including a plate member which has two clipping tabs, and, a band cover attached to the cover socket and the trim body.

* * * * *